(12) United States Patent
McCormick et al.

(10) Patent No.: US 11,634,130 B2
(45) Date of Patent: Apr. 25, 2023

(54) ADAPTING AN ADVANCED DRIVER ASSISTANCE SYSTEM OF A VEHICLE

(71) Applicant: Robert Bosch GmbH, Stuttgart (DE)

(72) Inventors: Troy McCormick, Milford, MI (US); Al-Laith Taha, Windsor (CA); Anup S. Deshpande, Troy, MI (US)

(73) Assignee: Robert Bosch GmbH, Stuttgart (DE)

( * ) Notice: Subject to any disclaimer, the term of this patent is extended or adjusted under 35 U.S.C. 154(b) by 96 days.

(21) Appl. No.: 16/830,837

(22) Filed: Mar. 26, 2020

(65) Prior Publication Data
US 2021/0300365 A1    Sep. 30, 2021

(51) Int. Cl.
| | |
|---|---|
| *B60W 30/14* | (2006.01) |
| *B60W 50/14* | (2020.01) |
| *B60W 50/00* | (2006.01) |
| *B60K 35/00* | (2006.01) |
| *B60W 50/06* | (2006.01) |
| *B60W 50/10* | (2012.01) |

(52) U.S. Cl.
CPC ............. *B60W 30/14* (2013.01); *B60K 35/00* (2013.01); *B60W 50/06* (2013.01); *B60W 50/10* (2013.01); *B60W 50/14* (2013.01); *B60K 2370/16* (2019.05); *B60W 2050/0014* (2013.01); *B60W 2050/146* (2013.01); *B60W 2710/18* (2013.01); *B60W 2720/106* (2013.01)

(58) Field of Classification Search
CPC ...... B60W 30/14; B60W 50/06; B60W 50/10; B60W 50/14; B60W 2050/0014; B60W 2050/146; B60W 2710/18; B60W 2720/106; B60K 35/00; B60K 2370/16
See application file for complete search history.

(56) References Cited

U.S. PATENT DOCUMENTS

| | | | | |
|---|---|---|---|---|
| 5,127,487 | A * | 7/1992 | Yamamoto | B60K 31/107 |
| | | | | 123/352 |
| 8,022,831 | B1 * | 9/2011 | Wood-Eyre | B60T 7/14 |
| | | | | 340/576 |
| 9,037,340 | B2 | 5/2015 | Elwart et al. | |
| 9,266,533 | B2 | 2/2016 | Zhao | |
| 9,266,536 | B2 | 2/2016 | Loria et al. | |
| 9,545,931 | B1 * | 1/2017 | Canale | G06V 20/59 |
| 2010/0102972 | A1 * | 4/2010 | Middlekauff | B62D 15/0215 |
| | | | | 340/576 |
| 2013/0187792 | A1 * | 7/2013 | Egly | G08G 1/162 |
| | | | | 340/901 |

(Continued)

*Primary Examiner* — Fadey S. Jabr
*Assistant Examiner* — Naeem Taslim Alam
(74) *Attorney, Agent, or Firm* — Michael Best & Friedrich LLP (57) ABSTRACT

Methods and systems for adapting an advanced driver assistance driving system of a vehicle. One system includes an electronic processor of an advanced driver assistance driving system. The electronic processor is configured to control the vehicle using a control parameter of the advanced driver assistance driving system. The electronic processor is also configured to activate a learning mode for the advanced driver assistance driving system and receive feedback associated with the control of the vehicle. The electronic processor is also configured to adjust the control parameter of the advanced driver assistance driving system based on the feedback and control the vehicle using the adjusted control parameter.

18 Claims, 7 Drawing Sheets

(56) References Cited

U.S. PATENT DOCUMENTS

| | | | |
|---|---|---|---|
| 2015/0175070 A1* | 6/2015 | Attard | B60W 50/14 |
| | | | 340/439 |
| 2015/0284008 A1* | 10/2015 | Tan | G05D 1/0231 |
| | | | 701/28 |
| 2017/0021830 A1* | 1/2017 | Feldman | B60W 30/16 |
| 2017/0057517 A1 | 3/2017 | Huq et al. | |
| 2017/0144659 A1* | 5/2017 | Thomas | B60W 30/14 |
| 2017/0327116 A1 | 11/2017 | Heo et al. | |
| 2018/0059661 A1* | 3/2018 | Sato | B60W 50/16 |
| 2018/0111616 A1* | 4/2018 | Herb | B60W 10/184 |
| 2018/0304860 A1* | 10/2018 | Singer | B60S 1/528 |
| 2018/0334167 A1* | 11/2018 | Drown | B60W 10/18 |
| 2019/0001977 A1 | 1/2019 | Lin et al. | |
| 2019/0111937 A1* | 4/2019 | Halesha | B60W 50/14 |
| 2019/0299783 A1* | 10/2019 | Aminev | B60K 35/00 |
| 2019/0358556 A1* | 11/2019 | Poteet | A63H 17/36 |
| 2019/0366844 A1* | 12/2019 | Yoon | A61B 5/18 |
| 2020/0001869 A1* | 1/2020 | Lotz | B60W 30/146 |
| 2020/0180623 A1* | 6/2020 | Bohrer | B60W 30/162 |
| 2020/0207348 A1* | 7/2020 | Sato | B60W 10/18 |
| 2020/0255011 A1* | 8/2020 | Sato | B60W 30/14 |
| 2021/0024066 A1* | 1/2021 | Hornstein | B60W 50/085 |
| 2021/0114584 A1* | 4/2021 | Hiratsuka | B60W 50/085 |

* cited by examiner

ADAPTING AN ADVANCED DRIVER ASSISTANCE SYSTEM OF A VEHICLE

FIELD

Embodiments relate adapting an advanced driver assistance system of a vehicle and, more particularly, to adapting a control parameter of an adaptive cruise control system of a vehicle based on driver feedback.

SUMMARY

Many modern vehicles are equipped with advanced driver assistance systems or partially-autonomous driving systems, such as adaptive cruise control ("ACC"). ACC is a comfort feature. ACC automatically adjusts cruise speeds based on, for example, the distance between a host or ego vehicle and a preceding vehicle so the driver does not need to manually adjust cruise control settings. For example, ACC will accelerate and decelerate the vehicle to keep a time gap between the ego vehicle and a preceding vehicle. The ACC function is generally calibrated for certain acceleration and deceleration targets, as well as reaction timing behaviors. There is typically only one tuning for a vehicle equipped with ACC. However, while some drivers may be comfortable with the default tuning of the ACC function, other drivers may not be. For example, some drivers may not feel comfortable with the tuning of the ACC function in cases where the ACC initiates braking of the vehicle too late or accelerates the vehicle too fast. Other drivers may be annoyed with the ACC function initiates braking of the vehicle too soon or accelerates too slowly. In other words, each driver may have a specific preference with respect to how aggressively the ACC function controls a vehicle.

Accordingly, while advanced driver assistance systems have several advantages, there is a need to adapt these systems such that vehicle behavior is controlled according to a comfort level of a driver or operator of the vehicle (for example, modify ACC tuning to provide earlier and less harsh braking for a more comfortable driving experience). To solve these and other problems, the embodiments described herein provide, among other things, methods and systems of adapting a driver assistance system of a vehicle, for example, an ACC. Embodiments described herein provide an ACC learning mode in which a driver may train the ACC to perform in such a way that is most comfortable to that specific driver. For example, while the ACC learning mode is active, a driver may provide active feedback to the ACC regarding how aggressively the ACC controls the vehicle given a current vehicle situation.

Adapting these systems in this way may, among other things, increase use of these systems, such that drivers feel comfortable using and relying on these systems, and improve the user experience of these systems, such that driver frustration is prevented or mitigated. Accordingly, embodiments described herein provide improved and customizable driver experience, address existing limitations in conventional systems (for example, predefined time gaps, predefined acceleration profiles, and predefined deceleration profiles).

For example, one embodiment provides a system for adapting an advanced driver assistance driving system of a vehicle. The system includes an electronic processor of the advanced driver assistance driving system. The electronic processor is configured to control the vehicle using a control parameter of the advanced driver assistance driving system. The electronic processor is also configured to activate a learning mode for the advanced driver assistance driving system. The electronic processor is also configured to receive feedback associated with the control of the vehicle. The electronic processor is also configured to adjust the control parameter of the advanced driver assistance driving system based on the feedback and control the vehicle using the adjusted control parameter.

Another embodiment provides a method for adapting an advanced driver assistance driving system of a vehicle. The method includes accessing a driver profile identifying a set of control parameters for the advanced driver assistance driving system. The method also includes controlling the vehicle with the advanced driver assistance driving system using the set of control parameters. The method also includes activating, with an electronic processor, a learning mode of the advanced driver assistance driving system. The method also includes receiving feedback associated with the control of the vehicle. The method also includes adjusting, with the electronic processor, at least one control parameter included in the set of control parameters based on the feedback. The method also includes controlling the vehicle with the advanced driver assistance driving system using the at least one adjusted control parameter.

Yet another embodiment provides a non-transitory, computer-readable medium storing instructions that, when executed by an electronic processor, perform a set of functions, the set of functions including, in response to activation of an advanced driver assistance driving system, accessing a driver profile identifying a set of control parameters for the advanced driver assistance driving system. The set of functions also includes controlling the vehicle with the advanced driver assistance driving system using the set of control parameters. The set of functions also includes detecting activation of a learning mode of the advanced driver assistance driving system. The set of functions also includes receiving feedback associated with the control of the vehicle and adjusting the set of control parameters based on the feedback. The set of functions also includes updating the driver profile based on the adjusted set of control parameters. The set of functions also includes controlling the vehicle with the advanced driver assistance driving system using the adjusted set of preferred control parameters.

Other aspects and embodiments of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software-based devices, as well as a plurality of different structural components may be used to implement the invention. In addition, embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software-based devices, as well as a plurality of different structural components may be utilized to implement various embodiments. It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
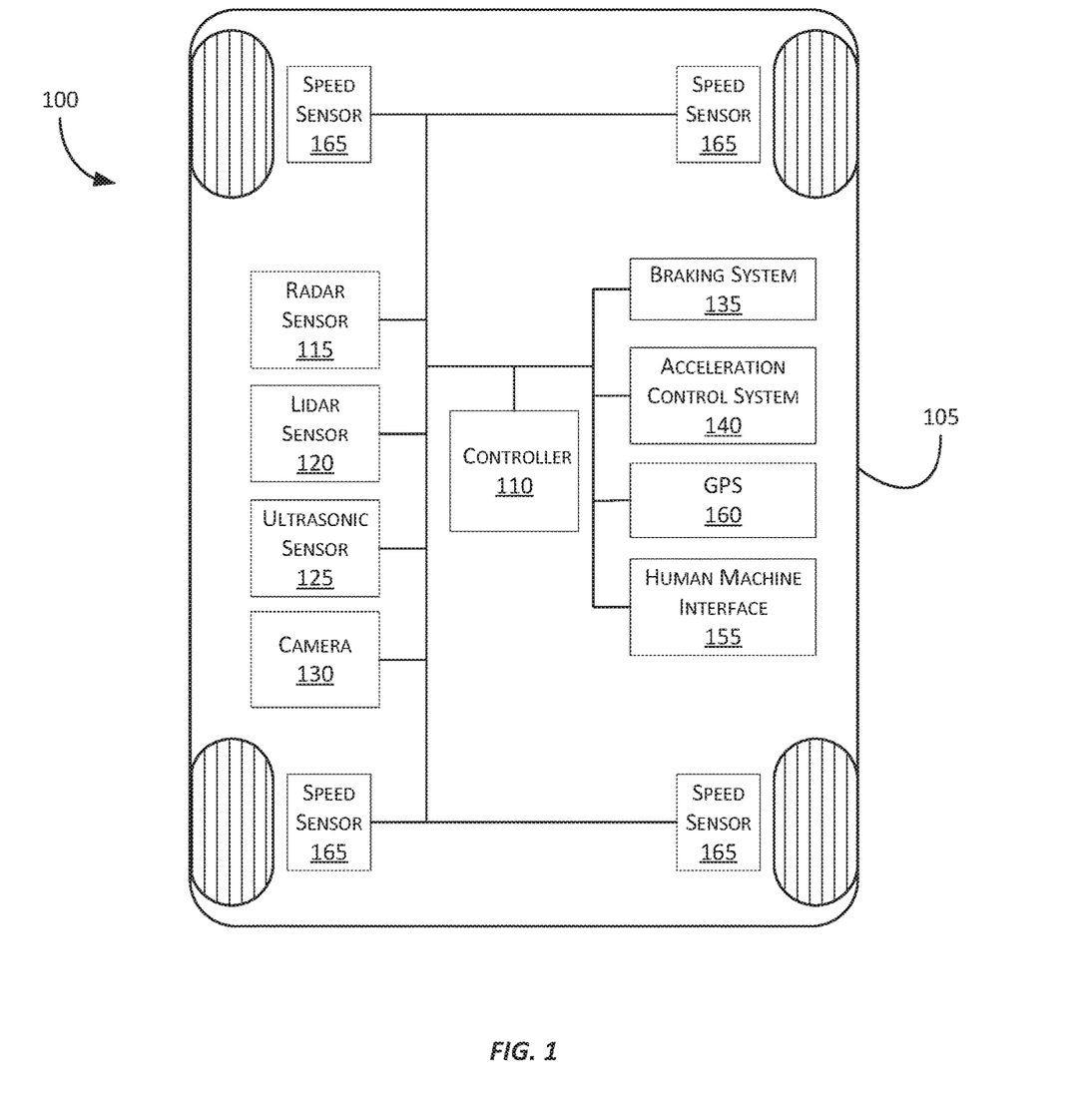
FIG. 1 schematically illustrates a vehicle equipped with a system for adapting an advanced driver assistance driving system of the vehicle according to some embodiments.

FIG. 1 illustrates a system 100 for adapting an advanced driver assistance driving system of a vehicle 105. The vehicle 105, although illustrated as a four-wheeled vehicle, may encompass various types and designs of vehicles. For example, the vehicle 105 may be an automobile, a motorcycle, a truck, a bus, a semi-tractor, or another type of vehicle.

In the example illustrated, the system 100 includes a controller 110, a radar sensor 115, a lidar sensor 120, an ultrasonic sensor 125, a camera 130, a braking system 135, an acceleration control system 140, a human machine interface 155, a geographical positioning system ("GPS") 160, and a plurality of speed sensors 165 (referred to herein collectively as "the speed sensors 165" and individually as "the speed sensor 165"). In some embodiments, the system 100 includes fewer, additional, or different components than those illustrated in FIG. 1 in various configurations and may perform additional functionality than the functionality described herein.

Figure 2:
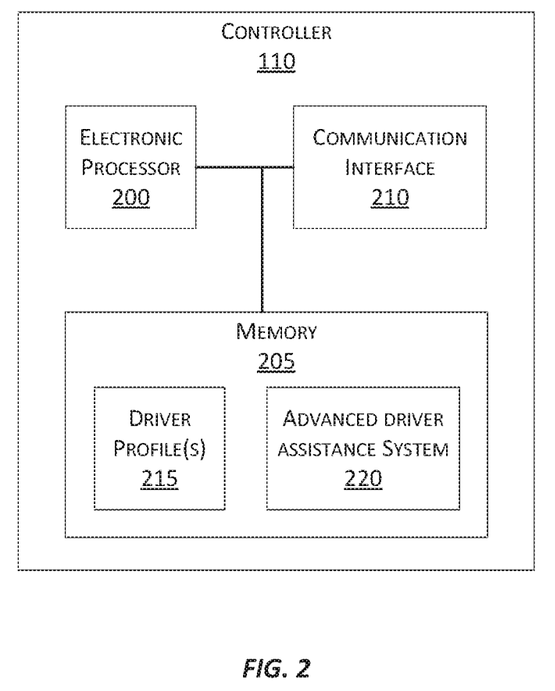
FIG. 2 schematically illustrates a controller included in the system of FIG. 1 according to some embodiments.

As illustrated in FIG. 2, the controller 110 includes an electronic processor 200 (for example, a microprocessor, an application specific integrated circuit, or another suitable electronic device), a memory 205 (for example, one or more non-transitory computer-readable storage mediums), and a communication interface 210. The electronic processor 200, the memory 205, and the communication interface 210 communicate, over one or more data connections or buses, or a combination thereof. The controller 110 illustrated in FIG. 2 represents one example, and, in some embodiments, the controller 110 includes fewer, additional, or different components in different configurations than illustrated in FIG. 2. The controller 110 may be implemented in several independent controllers (for example, programmable electronic controllers) each configured to perform specific functions or sub-functions. Alternatively or in addition, the controller 110 may contain sub-modules that include additional electronic processors, memory, or application specific integrated circuits (ASICs) for handling input/output functions, processing of signals, and application of the methods listed below. Also, in some embodiments, the controller 110 performs functionality in addition to the functionality described herein.

The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein. For example, in some embodiments, the electronic processor 200 executes instructions for controlling the braking system 135, the acceleration control system 140, or another vehicle system to perform an action (for example, a vehicle maneuver or vehicle behavior) pursuant to an advanced driver assistance driving system of the vehicle 105.

As illustrated in FIG. 2, the memory 205 may store a plurality of driver profiles 215 (referred to herein collectively as "the driver profiles 215" and individually as "the driver profile 215") and an advanced driver assistance driving system 220. A driver profile 215 includes a set of preferred control parameters or preferences associated with a particular driver or operator of the vehicle 105. The advanced driver assistance driving system 220 controls the vehicle 105 (for example, the braking system 135, the acceleration control system 140, or a combination thereof) to perform a vehicle maneuver with limited or no input from the driver of the vehicle 105 (for example, using the set of control parameters). The advanced driver assistance driving system 220 may include, for example, an adaptive cruise control ("ACC"), a highway assist ("HWA"), and the like.

The communication interface 210 allows the controller 110 to communicate with devices external to the controller 110 (for example, receive input from and provide output to devices external to the controller 110). For example, as seen in FIG. 1, the controller 110 may be communicatively connected to the radar sensor 115, the lidar sensor 120, the ultrasonic sensor 125, the camera 130, the braking system 135, the acceleration control system 140, the human machine interface 155, the GPS 160, and the speed sensors 165. In some embodiments, the communication interface 210 includes a port for receiving a wired connection with devices external to the controller 110. Accordingly, in some embodiments, the controller 110 is directly coupled via a dedicated wire to one or more components of the system 100. Alternatively or in addition, the communication interface 210 communicates with a communication bus (for example, a controller area network ("CAN")) to indirectly communicate with devices external to the controller 110. Accordingly, in other embodiments, the controller 110 is communicatively coupled to one or more of the components via a shared communication link, such as a vehicle communication network or bus (for example, a controller area network (CAN) bus, an Ethernet, or a FlexRay) or a wireless connection. Each of the components of the system 100 may communicate with the controller 110 using various communication types and protocols.

The radar sensor 115, the lidar sensor 120, the ultrasonic sensor 125, the camera 130, or a combination thereof are configured to receive signals indicative of a distance between the vehicle 105 and one or more additional vehicles in the environment surrounding the vehicle 105, a position of the vehicle 105 relative to the one or more additional vehicles in the environment surrounding the vehicle 105, or a combination thereof. The radar sensor 115, the lidar sensor 120, the ultrasonic sensor 125, the camera 130, or a combination thereof may be located at different positions on the interior or exterior of the vehicle 105. For example, the radar sensor 115, the lidar sensor 120, the ultrasonic sensor 125, the camera 130, or a combination thereof may be externally mounted to a portion of the vehicle 105, such as on a side mirror or front end of the vehicle 105. Alternatively or in addition, the radar sensor 115, the lidar sensor 120, the ultrasonic sensor 125, the camera 130, or a combination thereof may be internally mounted within the vehicle 105 (for example, positioned on a dashboard or by a rearview mirror of the vehicle 105).

The speed sensors 165 are configured to sense a speed associated with the vehicle 105. In some embodiments, the speed sensors 165 are implemented using wheel speed sensors that sense rotational speed. In the embodiment shown in FIG. 1, a single speed sensor 165 is associated with each wheel of the vehicle 105. In other embodiments, the speed associated with the vehicle 105 is sensed or determined using other sensors (for example, a transmission output speed sensor ("TOSS")) alone or in combination with the speed sensors 165.

The system 100 also includes the human machine interface 155. The human machine interface 155 is configured to receive input from and provide output to a user of the vehicle 105, such as a driver or passenger of the vehicle 105. For example, the human machine interface 155 includes a display, such as a touchscreen display, that displays, for example, information associated with the advanced driver assistance driving system 220 to a user of the vehicle 105. The human machine interface 155 also includes one or more input mechanisms, such as one or more user-selectable buttons, knobs, sliders, and the like, for receiving input from the user of the vehicle 105. For example, a user of the vehicle 105 may use the one or more input mechanisms of the human machine interface 155 to activate/deactivate the advanced driver assistance driving system 220, activate/deactivate a mode for the advanced driver assistance driving system 220 (for example, a learning mode), select a driver profile 215 for use with the advanced driver assistance driving system 220, provide feedback for the advanced driver assistance driving system 220, and the like.

In some embodiments, the human machine interface 155 is a preexisting component of the vehicle 105. For example, the human machine interface 155 may be part of an infotainment system, a navigation system, the advanced driver assistance driving system, or another system of the vehicle 105. For example, in some embodiments, the human machine interface 155 includes preexisting components of an adaptive cruise control system of the vehicle 105. In such embodiments, the one or more input mechanisms of the human machine interface 155 may include one or more input mechanisms positioned on a steering wheel of the vehicle 105, such as buttons associated with setting adaptive cruise control (for example, a "+ACC" button and a "−ACC" button).

Although not illustrated, the other components of the system 100 may include similar components as the controller 110 (an electronic processor, a memory, and a communication interface). However, in some embodiments, the other components of the system 100 includes additional, fewer, or different components than the controller 110 in different configurations.

Figure 3:
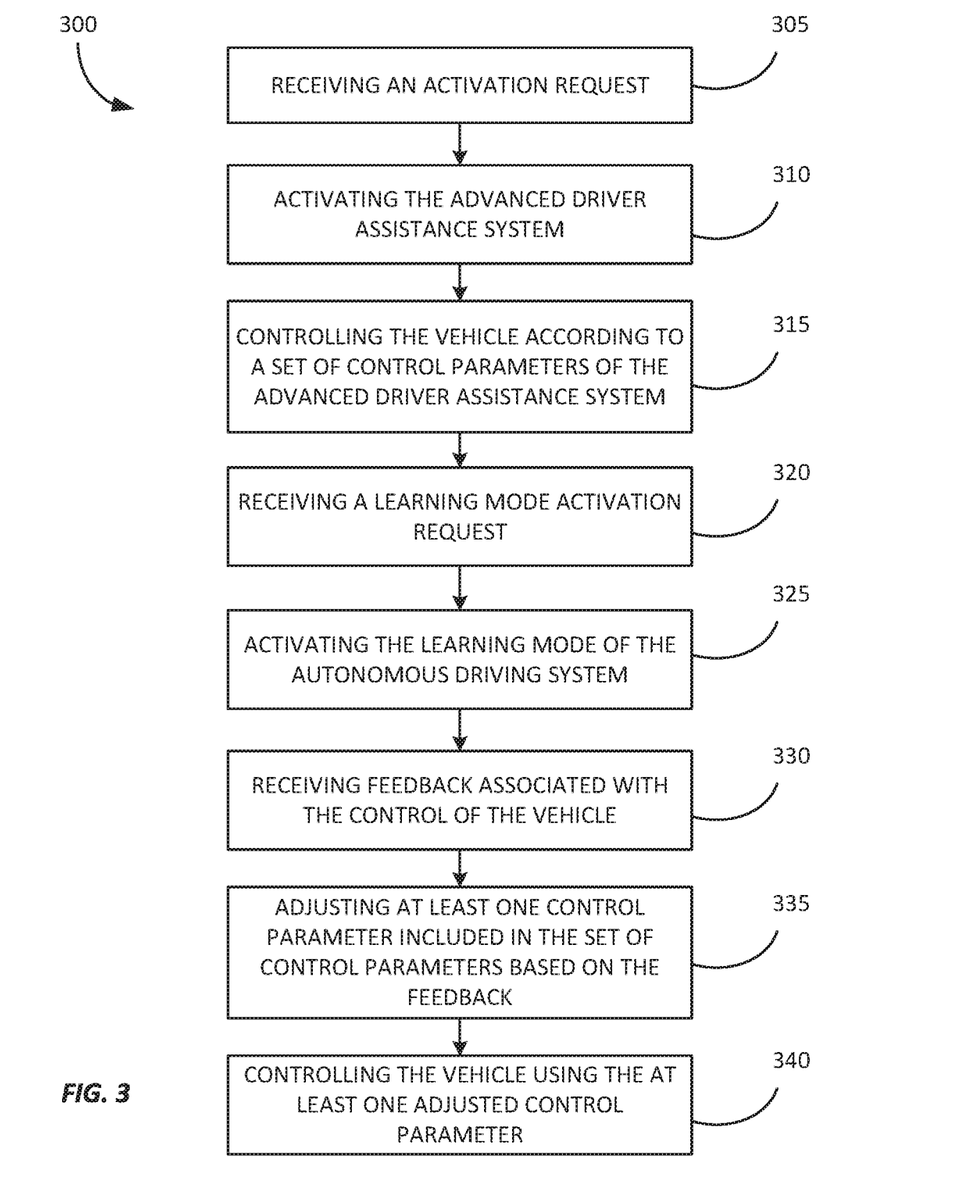
FIG. 3 is a flowchart illustrating a method for adapting an advanced driver assistance driving system of a vehicle performed by the system of FIG. 1 in accordance with some embodiments.

As noted above, the electronic processor 200 of the controller 110 executes instructions for adapting the advanced driver assistance driving system 220. The electronic processor 200 executes instructions to perform the method 300 illustrated in FIG. 3 for adapting the advanced driver assistance driving system 220. As illustrated in FIG. 3, the method 300 includes receiving an activation request (at block 305). The activation request may be associated with a driver of the vehicle 105 requesting activation of the advanced driver assistance driving system 220. The driver may initiate the activation request using the human machine interface 155. For example, the driver may activate an input mechanism of the human machine interface 155 associated with activating the advanced driver assistance driving system 220.

In response to receiving the activation request, the electronic processor 200 activates the advanced driver assistance driving system 220 (at block 310) and the electronic processor 200 controls the vehicle 105 according to a set of control parameters of the advanced driver assistance driving system 220 (at block 315).

The set of control parameters includes one or more parameters or settings used by the electronic processor 200 to control vehicle behavior pursuant to the advanced driver assistance driving system 220. A control parameter may include, for example, a time gap profile, an acceleration profile, a deceleration profile, and the like. A time gap profile generally refers to a clearance or distance between the vehicle 105 and another vehicle. For example, when the vehicle 105 is following another vehicle at a steady state along a road, the time gap profile may determine how closely the vehicle 105 follows the other vehicle (for example, a one second time gap or a three second time gap). An acceleration profile generally refers to how quickly or aggressively the vehicle 105 is accelerated (an acceleration target). For example, an acceleration profile may set how quickly the vehicle 105 is accelerated to a set speed. A braking profile generally refers to how quickly or aggressively the vehicle 105 is decelerated (a deceleration target). For example, a braking profile may set how quickly the vehicle is decelerated to a stop behind a target, such as another vehicle, a traffic light, a traffic sign, and the like.

The set of control parameters may be a default set of control parameters of the advanced driver assistance driving system 220 (for example, control parameters set by a manufacturer of the vehicle 105). However, in some embodiments, the set of control parameters are a set of preferred control parameters associated with a driver of the vehicle 105. In such embodiments, the electronic processor 200 may access (or load) a driver profile associated with a current driver of the vehicle 105 from the memory 205 (for example, one of the driver profiles 215). As noted above, the driver profile 215 are stored in the memory 205 of the controller 110. Accordingly, the electronic processor 200 may access the driver profile 215 from the memory 205. However, in some embodiments, the driver profile 215 is stored in an external storage device communicatively coupled with the controller 110. Accordingly, in such embodiments, the electronic processor 200 accesses the driver profile 215 from the external storage device. As noted above, the driver profile 215 identifies a set of preferred control parameters for the advanced driver assistance driving system 220, where the set of preferred control parameters were previously adopted (or tuned) via a learning mode of the advanced driver assistance driving system 220, as described in greater detail below.

Accordingly, in some embodiments, the electronic processor 200 determines an identity of the driver. The electronic processor 200 may determine the identity of the driver based on user input provided via the human machine interface 155. For example, the driver may select a driver profile from a listing of driver profiles displayed to the driver. Alternatively or in addition, the electronic processor 200 may determine the identity of the driver by recognizing a key or key fob used to turn on the vehicle 105. Alternatively or in addition, the electronic processor 200 may determine the identity of the driver using other known techniques, such as facial recognition. Based on the identity of the driver, the electronic processor 200 accesses (or loads) the driver profile 215 associated with the identified driver. When a driver profile 215 is unavailable, the electronic processor 200 may, among other things, rely on the default control parameters of the advanced driver assistance driving system 220.

In some embodiments, the driver profile 215 is transferable or sharable. For example, a driver may share his/her tuned driver profile with another driver. Accordingly, in such embodiments, the electronic processor 200 may access (or load) a driver profile 215 associated with a driver other than the current driver of the vehicle 105. In such embodiments, the current driver of the vehicle 105 may select another driver's driver profile 215 (via, for example, the human machine interface 155). In response to this selection, the electronic processor 200 may access (or load) the selected driver profile 215 from storage.

A driver's preferences may vary depending on a driving situation. For example, a driver may prefer a less aggressive control parameter when traveling at higher speeds and a more aggressive control parameter when traveling at lower speeds. Accordingly, each control parameter included in the set of control parameters may be specific to a particular driving situation. Therefore, in some embodiments, the electronic processor 200 determines a current driving situation for the vehicle 105 and controls the vehicle 105 according to one or more control parameters associated with the current driving situation.

The electronic processor 200 may determine a driving situation based on, for example, an operating condition of the vehicle 105, an environmental condition, or a combination thereof. An operating condition may include a speed of the vehicle 105, a performance mode of the vehicle 105 (for example, a sport mode, a snow mode, and the like), and the like. An environmental condition may include, for example, a weather condition (for example, foggy, snowy, rainy, and the like), a temperature (for example, below 32° F.), a time of day (for example, at night, at dusk, during the day, and the like), a geographical location (for example, a school zone, an urban environment, a rural environment, and the like), a road type (for example, a gravel road, a highway, and the like), and the like.

The electronic processor 200 may determine the current driving situation based on information from various sources, such as one or more of the components of the system 100, one or more additional vehicle sensors, another vehicle system, or a combination thereof. For example, the electronic processor 200 may determine the driving situation based on speed information received from one or more of the speed sensors 165, location information received from the GPS 160, performance mode information received from the human machine interface 155, additional information, or a combination thereof.

As seen in FIG. 3, the method 300 also includes receiving a learning mode activation request (at block 320). In one example, the learning mode activation request is associated with a driver of the vehicle 105 requesting activation of a learning mode associated with the advanced driver assistance driving system 220. The learning mode of the advanced driver assistance driving system 220 allows a driver to train or tune one or more control parameters of the advanced driver assistance driving system 220 such that the vehicle 105 is controlled by the advanced driver assistance driving system 220 (the electronic processor 200) in a way that is most comfortable or preferred for the driver. The driver may initiate the learning mode activation request using the human machine interface 155. In one example, the driver activates an input mechanism of the human machine interface 155 associated with activating the learning mode of the advanced driver assistance driving system 220.

In response to receiving the learning mode activation request, the electronic processor 200 activates the learning mode of the advanced driver assistance driving system 220 (at block 325). While the learning mode is active, the electronic processor 200 continues to control the vehicle 105 according to the set of control parameters of the advanced driver assistance driving system 220 (as described above with respect to block 315). Additionally, while the learning mode is active, the electronic processor 200 may receive feedback associated with the control of the vehicle 105 (at block 330). In some embodiments, the feedback is associated with how aggressively the advanced driver assistance driving system 220 controls the vehicle 105 (i.e., an aggressiveness of the set of control parameters). As previously noted, a driver may be uncomfortable with a tuning of the advanced driver assistance driving system 220. For example, a driver may feel that the advanced driver assistance driving system 220 (the electronic processor 200) controls the vehicle too aggressively or not aggressively enough depending on a current driving situation.

Accordingly, during the learning mode, the driver of the vehicle 105 may provide feedback to the advanced driver assistance driving system 220. The driver may provide feedback through one or more input mechanisms of the human machine interface 155. The one or more input mechanisms may be dedicated specifically for receiving feedback related to the advanced driver assistance driving system 220. In other words, a primary function of the one or more input mechanisms may be receiving feedback related to the advanced driver assistance driving system 220. Alternatively or in addition, in some embodiments, when the learning mode is activated, the electronic processor 200 activates a secondary function of one or more preexisting input mechanisms, where the secondary function is receiving feedback related to the advanced driver assistance driving system 220. In one example, the electronic processor 200 activates a secondary function for at least one input mechanism associated with a steering wheel of the vehicle, such as one or more buttons associated with setting adaptive cruise control (for example, a "+ACC" button and a "−ACC" button). Alternatively or in addition, the driver may provide feedback through another input mechanism of the vehicle 105, such as an accelerator of the vehicle 105 or a brake pedal of the vehicle 105. Alternatively or in addition, the driver may provide verbal feedback (for example, voice commands) through a microphone of the vehicle 105.

For example, while the electronic processor 200 is controlling the vehicle 105 according to the set of control parameters, a driver may activate an input mechanism to indicate that the driver is uncomfortable with the current control of the vehicle 105. For example, when the driver feels that the current control of the vehicle 105 is not aggressive enough, the driver may activate a +ACC button on a steering wheel of the vehicle 105 to indicate a desire for a more aggressive vehicle behavior given the current driving situation. Conversely, when the driver feels that the current control of the vehicle 105 is too aggressive, the driver may activate a −ACC button on the steering wheel of the vehicle 105 to indicate a desire for a less aggressive vehicle behavior given the current driving situation.

For example, when the vehicle 105 is accelerating up to a set speed (with or without a target in front of the vehicle 105, a driver of the vehicle 105 may activate a +ACC button to adjust a maximum ACC acceleration target to be higher or more aggressive. Alternatively, the driver of the vehicle 105 may activate a −ACC button to adjust a maximum ACC acceleration target to be lower or less aggressive. As another example, when the vehicle 105 is decelerating behind a target, a driver of the vehicle 105 may activate a +ACC button to adjust a timing of initiating braking to be later with a more aggressive braking. Alternatively, the driver of the vehicle 105 may activate a −ACC button to adjust the timing of initiating braking to be earlier with a less aggressive braking. As yet another example, when the vehicle 105 is following behind another vehicle, a driver of the vehicle 105 may activate a +ACC button to decrease a time gap for a current speed of the vehicle 105. Alternatively, the driver of the vehicle 105 may activate a −ACC button to increase a time gap for a current speed of the vehicle 105.

In response to receiving the feedback, the electronic processor 200 adjusts at least one control parameter included in the set of control parameters based on the feedback (at block 335) and the electronic processor 200 controls the vehicle 105 using the at least one adjusted control parameter (at block 340). In some embodiments, the electronic processor 200 updates the set of control parameters with the at least one adjusted control parameter (as an adjusted set of control parameters). In some embodiments, the set of control parameters are bound to a predefined operating range (for example, a safety operating range). Accordingly, in such embodiments, the electronic processor 200 determines whether an adjustment to the set of control parameters is within a defined operating range and updates the set of control parameters based on whether the adjustment to the set of control parameters is within the defined operating range.

The electronic processor 200 stores the adjusted set of control parameters. In some embodiments, the electronic processor 200 stores the adjusted set of control parameters such that the adjusted set of control parameters are associated with the driver profile 215 of the driver. The electronic processor 200 controls the vehicle 105 using the at least one adjusted control parameter by accessing the adjusted set of control parameters from storage (for example, the memory 205 of the controller 110). In some embodiments, the electronic processor 200 immediately adjusts the control of the vehicle 105 based on the feedback. In other words, in response to receiving the feedback for a vehicle maneuver that is in the process of being performed, the electronic processor 200 may adjusted the vehicle maneuver based on the received feedback. In some embodiments, the electronic processor 200 adjusts the at least one control parameter in an incremental manner. In one example, the electronic processor 200 adjusts a time gap parameter by decreasing or increasing the time gap by one second.

In some embodiments, the electronic processor 200 generates and transmits a deactivation recommendation. The deactivation recommendation prompts the driver of the vehicle 105 to deactivate (or exit) the learning mode of the advanced driver assistance driving system 220. In one example, the deactivation recommendation is provided to a driver of the vehicle 105 via the human machine interface 155. The electronic processor 200 may generate and transmit the deactivation recommendation based on a lack of feedback received by the driver of the vehicle 105. In some embodiments, the electronic processor 200 generates and transmits the deactivation recommendation based on a duration of elapsed time without receiving feedback, a particular travel distance without receiving feedback, a number of performed vehicle maneuvers without receiving feedback, and the like. In one example, after performing twenty vehicle maneuvers without receiving feedback, the electronic processor 200 generates and transmits the deactivation recommendation. The driver of the vehicle 105 may interact with the deactivation recommendation via the human machine interface 155. For example, the driver may deactivate the learning mode or the driver may dismiss the deactivation recommendation to keep the learning mode active.

In some embodiments, the electronic processor 200 receives a learning mode deactivation request. In some embodiments, the electronic processor 200 receives the learning mode deactivation request in response to a driver of the vehicle 105 activating an input mechanism associated with deactivating the learning mode. However, in some embodiments, the electronic processor 200 receives the learning mode deactivation request in response to a driver of the vehicle 105 interacting with a deactivation recommendation. In response to receiving the learning mode deactivation request, the electronic processor 200 deactivates the learning mode of the advanced driver assistance driving system 220. In some embodiments, the advanced driver assistance driving system 220 remains active after the electronic processor 200 deactivates the learning mode. In other words, after the learning mode is deactivated, the electronic processor 200 continues to control the vehicle 105 using the set of adjusted control parameters of the advanced driver assistance driving system 220.

In some embodiments, the electronic processor 200 generates and transmits adjustment information to the human machine interface 155 for display. The adjustment information may provide feedback relating to one or more adjustments made to the set of control parameters. For example, the adjustment information may indicate that a time gap parameter was decreased from three seconds to 2 seconds when traveling a highway speeds (for example, 50 mph-75 mph). The electronic processor 200 may generate and transmit the adjustment information in real-time (or near real-time). For example, the electronic processor 20 may generate and transmit the adjustment information immediately after adjusting a control parameter. Alternatively or in addition, the electronic processor 200 may generate and transmit the adjustment information as a report upon deactivation of the learning mode of the advanced driver assistance driving system 220. In such embodiments, the adjustment information may include a listing of each adjustment made while the learning mode was active.

Figure 4:
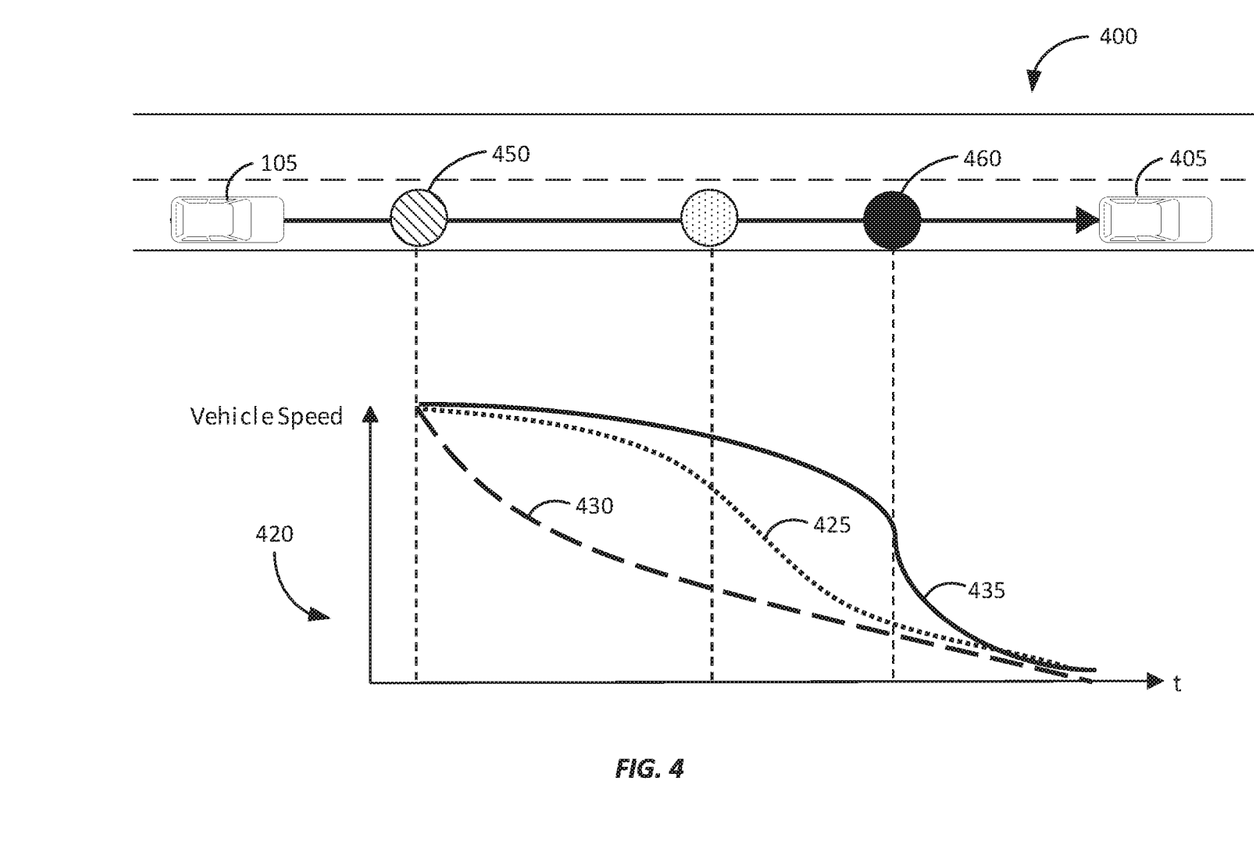
FIG. 4 schematically illustrates an exemplary driving situation where a vehicle is approaching a target vehicle that is traveling at a slower speed than the vehicle and corresponding deceleration profiles.

FIG. 4 illustrates a first example driving situation 400 where the vehicle 105 is approaching a target vehicle 405 that is traveling at a slower speed than the vehicle 105. FIG. 4 also includes three example deceleration profiles (sets of control parameters) used for controlling the deceleration of the vehicle 105. For example, graph 420 includes a first deceleration curve 425 associated with a default deceleration profile, a second deceleration curve 430 associated with a less aggressive deceleration profile, and a third deceleration curve 435 associated with a more aggressive deceleration profile. The first deceleration curve 425 graphically illustrates how the electronic processor 200 may control the deceleration of the vehicle 105 pursuant to a default deceleration profile. The second deceleration curve 430 graphically illustrates how the electronic processor 200 may control the deceleration of the vehicle 105 pursuant to a less aggressive deceleration profile (in comparison to the default deceleration profile). The third deceleration curve 435 graphically illustrates how the electronic processor 200 may control the deceleration of the vehicle 105 pursuant to a more aggressive deceleration profile (in comparison to the default deceleration profile).

The default deceleration profile may be associated with a preset deceleration profile set as a default by a manufacturer of the vehicle 105. In response to feedback provided by a driver the vehicle 105, the electronic processor 200 may tune or adjust the default deceleration profile such that the deceleration profile used to control the vehicle 105 is more or less aggressive. For example, while the electronic processor 200 is controlling the vehicle 105 according to a default deceleration profile, a driver may activate an input mechanism to indicate that the driver is uncomfortable with the current deceleration of the vehicle 105. The driver may activate a −ACC button or press the brake pedal of the vehicle 105 (at reference numeral 450). In response to this feedback, the electronic processor 200 may adjust the default deceleration profile of the vehicle 105 to the less aggressive deceleration profile (for example, represented by the second deceleration curve 430). In comparison to the default deceleration profile, the less aggressive deceleration profile has an earlier start time for deceleration of the vehicle 105 and a slower deceleration of the vehicle 105. Alternatively, the driver may activate a +ACC button or press the accelerator of the vehicle 105 (at reference numeral 460). In response to this feedback, the electronic processor 200 may adjust the default deceleration profile of the vehicle 105 to the more aggressive deceleration profile (for example, represented by the third deceleration curve 435). In comparison to the default deceleration profile, the more aggressive deceleration profile has a later start time for deceleration of the vehicle 105 and a faster deceleration of the vehicle 105.

Figure 5:
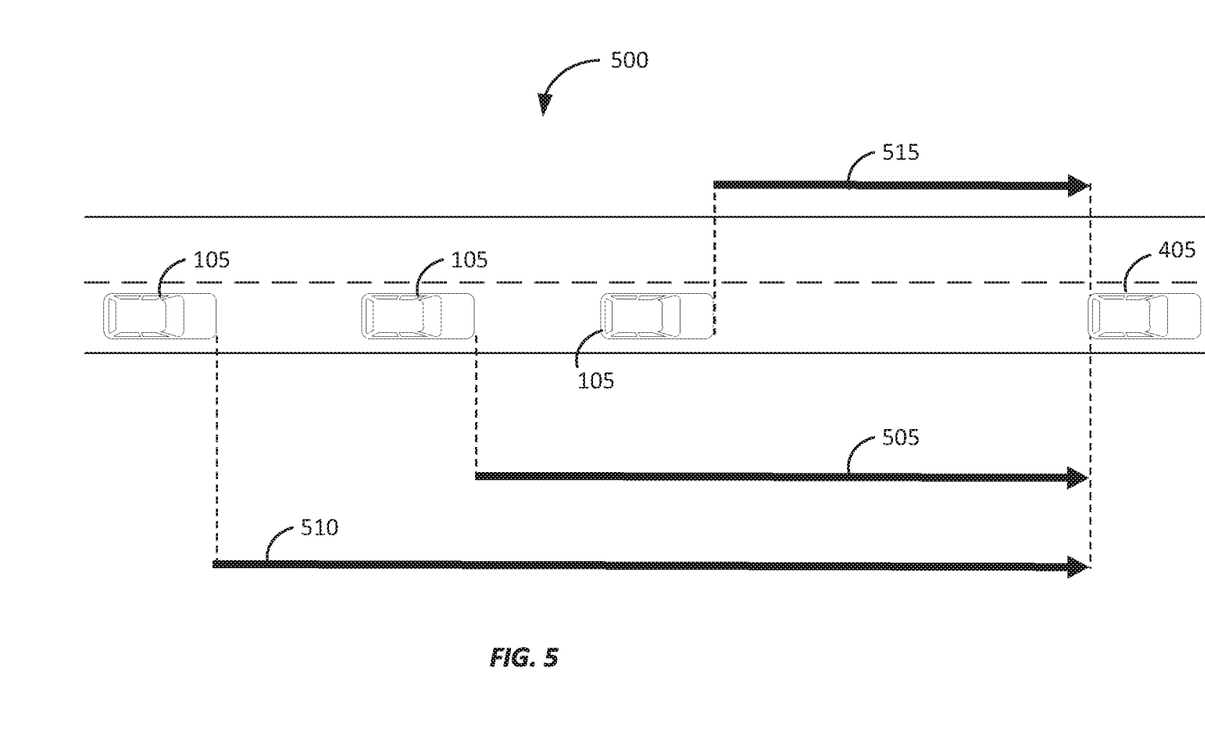
FIG. 5 schematically illustrates another exemplary driving situation where a vehicle is traveling at a steady state behind a target vehicle and corresponding time gap profiles.

FIG. 5 illustrates a second example driving situation 500 where the vehicle 105 is traveling at a steady state behind the target vehicle 405. FIG. 5 also illustrates three example time gap profiles (sets of control parameters), including a default time gap profile 505, a less aggressive time gap profile 510, and a more aggressive time gap profile 515. The electronic processor 200 may use the default time gap profile 505, the less aggressive time gap profile 510, or the more aggressive time gap profile 515 for controlling a time gap between the vehicle 105 and the target vehicle 405.

The default time gap profile 505 may be associated with a preset time gap profile set as a default by a manufacturer of the vehicle 105 (for example, a 1.5 second time gap). In response to feedback provided by a driver the vehicle 105, the electronic processor 200 may tune or adjust the default time gap profile 505 such that the time gap profile used to control the vehicle 105 is more or less aggressive. For example, while the electronic processor 200 is controlling the vehicle 105 according to the default time gap profile 505, a driver may activate an input mechanism to indicate that the driver is uncomfortable with the current time gap between the vehicle 105 and the target vehicle 405. The driver may activate a −ACC button or press the brake pedal of the vehicle 105. In response to this feedback, the electronic processor 200 may adjust the default time gap profile 505 of the vehicle 105 to the less aggressive time gap profile 510. In comparison to the default time gap profile 505, the less aggressive time gap profile 510 has an increased time gap (for example, a greater clearance or distance between the vehicle 105 and the target vehicle 405, such as a 2 second time gap). Alternatively, the driver may activate a +ACC button or press the accelerator of the vehicle 105. In response to this feedback, the electronic processor 200 may adjust the default time gap profile 505 of the vehicle 105 to the more aggressive time gap profile 515. In comparison to the default time gap profile 505, the more aggressive deceleration profile 515 has a reduced time gap (for example, a lower clearance or distance between the vehicle 105 and the target vehicle 405, such as a 1 second time gap).

Figure 6A:
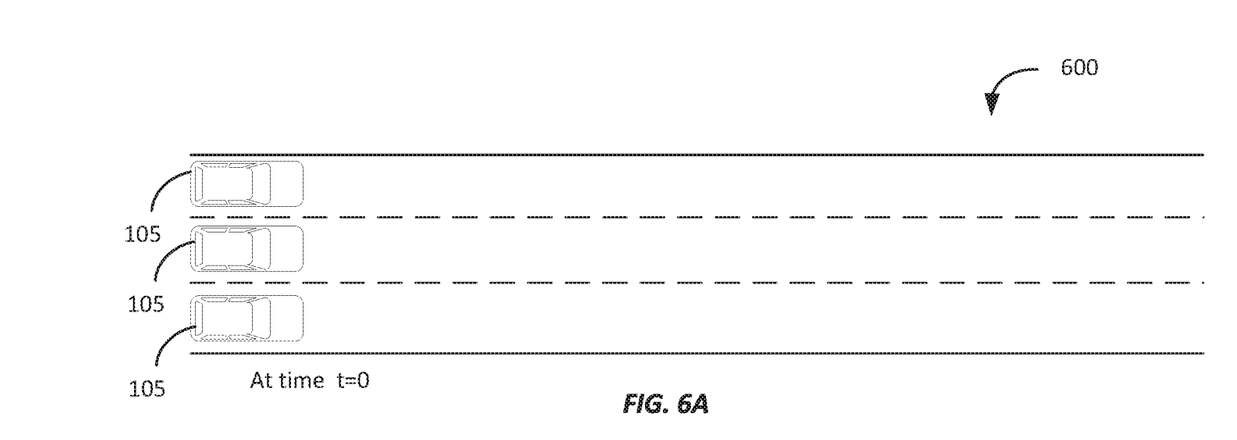
FIGS. 6A-6B schematically illustrates yet another exemplary driving situation where a vehicle accelerates from rest and corresponding acceleration profiles.
Figure 6B:
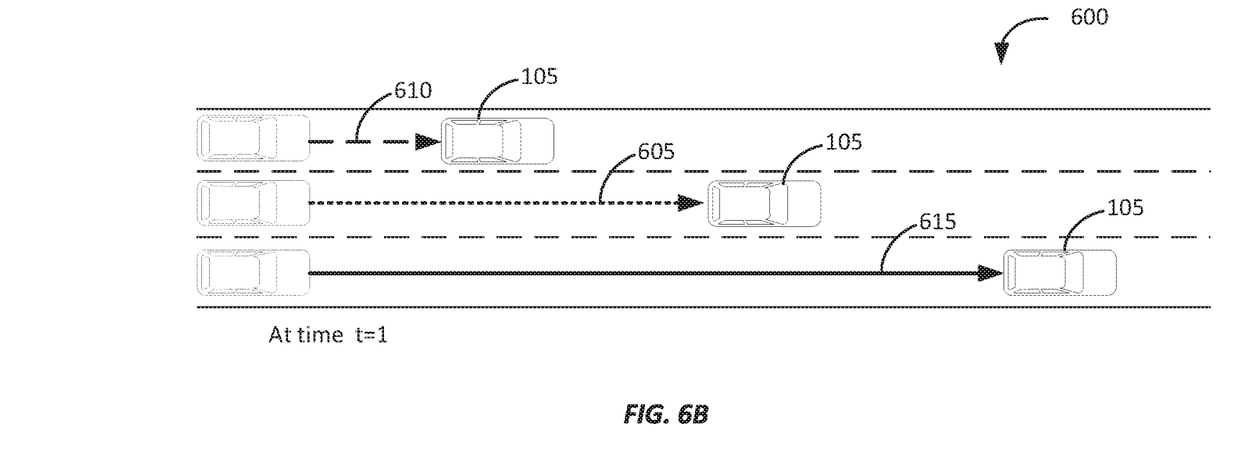

FIGS. 6A-6B illustrate a third example driving situation 600 where the vehicle 105 is at rest (FIG. 6A) and begins traveling forward (FIG. 6B), such as accelerating from a stop. FIG. 6B also illustrates three example acceleration profiles (sets of control parameters), a default acceleration profile 605, a less aggressive acceleration profile 610, and a more aggressive acceleration profile 615. The electronic processor 200 may use the default acceleration profile 605, the less aggressive acceleration profile 610, or the more aggressive acceleration profile 615 for controlling the acceleration of the vehicle 105.

The default acceleration profile 605 may be associated with a preset acceleration profile set as a default by a manufacturer of the vehicle 105. In response to feedback provided by a driver the vehicle 105, the electronic processor 200 may tune or adjust the default acceleration profile 605 such that the acceleration profile used to control the vehicle 105 is more or less aggressive. For example, while the electronic processor 200 is controlling the vehicle 105 according to the default acceleration profile 605, a driver may activate an input mechanism to indicate that the driver is uncomfortable with the current acceleration of the vehicle 105. The driver may activate a −ACC button or press the brake pedal of the vehicle 105. In response to this feedback, the electronic processor 200 may adjust the default acceleration profile 605 of the vehicle 105 to the less aggressive acceleration profile 610. In comparison to the default acceleration profile 605, the less aggressive acceleration profile 610 has a later acceleration and a less aggressive acceleration. Alternatively, the driver may activate a +ACC button or press the accelerator of the vehicle 105. In response to this feedback, the electronic processor 200 may adjust the default acceleration profile 605 of the vehicle 105 to the more aggressive acceleration profile 615. In comparison to the default acceleration profile 605, the more aggressive acceleration profile 615 has an earlier acceleration and a more aggressive acceleration.

Figure 6C:
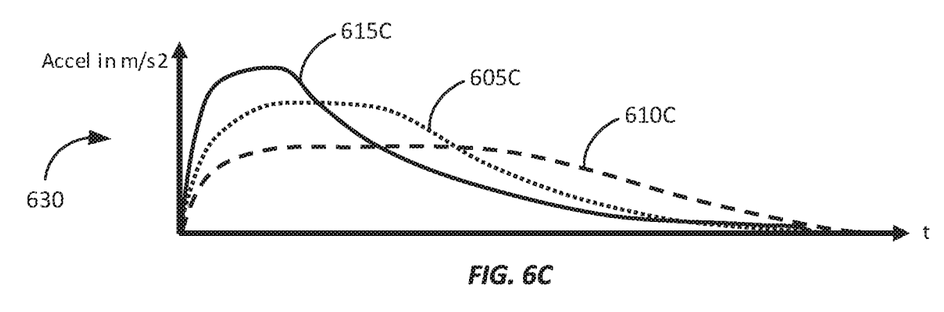
FIG. 6C graphically represents exemplary acceleration profiles for the driving situation of FIGS. 6A-6B.
Figure 6D:
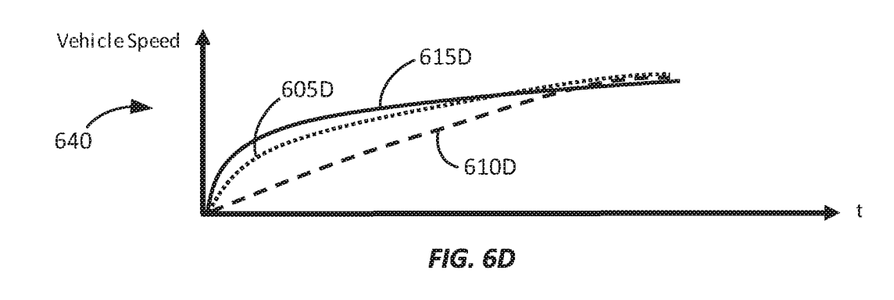
FIG. 6D graphically represents exemplary speed profiles for the driving situation of FIGS. 6A-6B.

FIG. 6C graphically illustrates a first acceleration curve 605C associated with the default acceleration profile 605, a second acceleration curve 610C associated with the less aggressive acceleration profile 610, and a third acceleration curve 615C associated with the more aggressive acceleration profile 615. FIG. 6D graphically illustrates a first speed curve 605D associated with the default acceleration profile 605, a second speed curve 610D associated with the less aggressive acceleration profile 610, and a third speed curve 615D associated with the more aggressive acceleration profile 615.

As noted above, in some embodiments, the driver of the vehicle 105 may provide feedback via an accelerator or a brake pedal of the vehicle 105. In some embodiments, the electronic processor 200 adjusts the set of control parameters based on a force applied to the accelerator or the brake pedal by the driver. For example, the greater the force applied to the accelerator or the brake pedal by the driver, the greater the adjustment to the set of control parameters. Accordingly, in some embodiments, the electronic processor 200 determines an amount of force applied to an input mechanism, such as an accelerator or a brake pedal, and determines an adjustment for the set of control parameters based on the amount of force.

Thus, the embodiments provide, among other things, methods and systems for adapting an advanced driver assistance driving system of a vehicle. Various features and advantages of certain embodiments are set forth in the following claims.

What is claimed is:

1. A system for adapting an adaptive cruise control system of a vehicle, the system comprising:
    an electronic processor of the system, the electronic processor configured to drive the vehicle using a control parameter of the adaptive cruise control system,
        receive, from a driver of the vehicle, a request to activate a learning mode for the adaptive cruise control system,
        activate, in response to receiving the request, the learning mode for the adaptive cruise control system,
        receive, from the driver via an accelerator pedal or a brake pedal of the vehicle, feedback associated with control of a speed of the vehicle,
        adjust the control parameter of the adaptive cruise control system based on the feedback,
        deactivate the learning mode of the adaptive cruise control system in response to receiving a learning mode deactivation request from a driver of the vehicle, and
        continue driving the vehicle using the adjusted control parameter of the adaptive cruise control system after (a) receiving the feedback from the driver via the accelerator pedal or the brake pedal and (b) deactivating the learning mode.

2. The system of claim 1, wherein the control parameter of the adaptive cruise control system is a time gap parameter.

3. The system of claim 2, wherein the electronic processor is configured to adjust the control parameter by at least one selected from a group consisting of increasing the time gap parameter of the adaptive cruise control system and decreasing the time gap parameter of the adaptive cruise control system.

4. The system of claim 1, wherein the control parameter of the adaptive cruise control system includes at least one selected from a group consisting of an acceleration parameter and a braking parameter.

5. The system of claim 1, wherein the electronic processor is further configured to update a driver profile based on the adjusted control parameter.

6. A method for adapting an adaptive cruise control system of a vehicle, the method comprising:
    accessing a driver profile identifying a set of control parameters for the adaptive cruise control system;
    driving the vehicle with the adaptive cruise control system using the set of control parameters;
    receiving, from a driver of the vehicle, a request to activate a learning mode for the adaptive cruise control system;
    activating, with an electronic processor, a learning mode of the adaptive cruise control system in response to receiving the request;
    receiving, from the driver via an accelerator pedal or a brake pedal of the vehicle, feedback associated with control of a speed of the vehicle;
    adjusting, with the electronic processor, at least one control parameter included in the set of control parameters based on the feedback;
    deactivating the learning mode of the adaptive cruise control system in response to receiving a learning mode deactivation request from a driver of the vehicle; and
    continuing to drive the vehicle using the adaptive cruise control system using the at least one adjusted control parameter following receiving the feedback from the driver via the accelerator pedal or the brake pedal and deactivating the learning mode.

7. The method of claim 6, further comprising:
    updating the driver profile based on the at least one adjusted control parameter.

8. The method of claim 6, wherein accessing the driver profile includes accessing the driver profile in response to activating the adaptive cruise control system.

9. The method of claim 6, further comprising:
    transmitting a report to a display of the vehicle, the report including a listing of adjustments to made to the set of control parameters.

10. The method of claim 6, further comprising:
    identifying a driver of the vehicle, wherein the driver profile is associated with the identified driver.

11. The method of claim 6, further comprising:
    generating and transmitting a deactivation recommendation prompting deactivation of the learning mode.

12. The method of claim 6, further comprising:
    generating and transmitting adjustment information for display, the adjustment information associated with the at least one adjusted control parameter.

13. The method of claim 6, wherein adjusting the set of control parameters includes adjusting a time gap parameter of the adaptive cruise control system.

14. The method of claim 6, wherein adjusting the set of control parameters includes adjusting an acceleration parameter of the adaptive cruise control system.

15. The method of claim 6, wherein adjusting the set of control parameters includes adjusting a deceleration parameter of the adaptive cruise control system.

16. The system of claim 1, wherein the electronic processor is further configured to generate a deactivation recommendation in response to one selected from a group consisting of a duration of elapsed time without receiving additional feedback, a particular travel distance without receiving additional feedback, and a number of performed vehicle maneuvers without receiving additional feedback.

17. The system of claim 1, wherein adjusting the control parameter of the adaptive cruise control system includes incrementally increasing or decreasing the control parameter.

18. A system for adapting an adaptive cruise control system of a vehicle, the system comprising:
    an electronic processor of the system, the electronic processor configured to drive the vehicle using a control parameter of the adaptive cruise control system, receive, from a driver of the vehicle, a request to activate a learning mode for the adaptive cruise control system, activate, in response to receiving the request, the learning mode for the adaptive cruise control system, continue to drive the vehicle using the control parameter of the adaptive cruise control system, receive, from the driver via an accelerator pedal or a brake pedal of the vehicle, feedback associated with control of a speed of the vehicle, adjust the control parameter of the adaptive cruise control system based on the feedback, drive the vehicle using the adjusted control parameter of the adaptive cruise control system after receiving the feedback from the driver via the accelerator pedal or the brake pedal, generate a deactivation recommendation to deactivate the learning mode, and deactivate the learning mode of the adaptive cruise control system in response to at least one selected from the group consisting of an occurrence of a predetermined condition and receiving a learning mode deactivation request from a driver of the vehicle wherein the electronic processor is configured to continue driving the vehicle using the adjusted control parameter of the adaptive cruise control system after (a) receiving the feedback from the driver via the accelerator pedal or the brake pedal and (b) deactivating the learning mode.

* * * * *